United States Patent
Kohl et al.

(10) Patent No.: US 9,848,464 B2
(45) Date of Patent: Dec. 19, 2017

(54) HEATING DEVICE

(71) Applicants: Behr GmbH & Co. KG, Stuttgart (DE); Behr France Rouffach SAS, Rouffach (FR); Behr-Hella Thermocontrol GmbH, Lippstadt (DE)

(72) Inventors: Michael Kohl, Bietigheim-Bissingen (DE); Karl-Gerd Krumbach, Burgstetten (DE); Karl Lochmahr, Vaihingen/Enz (DE); Wolfgang Seewald, Tamm (DE); Olivier Schunck, Thanville (FR); Dirk Nagel, Paderborn (DE); Lars Heeper, Paderborn (DE); Matthias Stallein, Rietberg (DE); Michael Steinkamp, Lippstadt (DE); Karsten Marquas, Arnsberg (DE); Volker Dicke, Bestwig-Heringhausen (DE)

(73) Assignees: MAHLE INTERNATIONAL GMBH, Stuttgart (DE); BEHR-HELLA THERMOCONTROL GMBH, Lippstadt (DE)

( * ) Notice: Subject to any disclaimer, the term of this patent is extended or adjusted under 35 U.S.C. 154(b) by 540 days.

(21) Appl. No.: 13/948,603

(22) Filed: Jul. 23, 2013

(65) Prior Publication Data
US 2014/0027444 A1    Jan. 30, 2014

(30) Foreign Application Priority Data
Jul. 24, 2012 (EP) .................................... 12290256

(51) Int. Cl.
H05B 6/10    (2006.01)
H05B 6/02    (2006.01)
(Continued)

(52) U.S. Cl.
CPC ............ *H05B 6/108* (2013.01); *B60H 1/2221* (2013.01); *F24H 1/101* (2013.01); *B60H 2001/2271* (2013.01); *F24D 2200/08* (2013.01)

(58) Field of Classification Search
CPC .......... B60H 1/2221; B60H 2001/2271; H05B 6/108; F24H 1/101; F24D 2200/08
(Continued)

(56) References Cited

U.S. PATENT DOCUMENTS

| | | | |
|---|---|---|---|
| 1,818,953 A | | 8/1931 | Holmes |
| 2,407,562 A | * | 9/1946 | Lofgren ................. H05B 6/108 |
| | | | 219/630 |

(Continued)

FOREIGN PATENT DOCUMENTS

| | | |
|---|---|---|
| CN | 101828425 A | 9/2010 |
| EP | 0 075 811 A1 | 4/1983 |

(Continued)

OTHER PUBLICATIONS

European Search Report, Application No. 12290256.2-2423, Dec. 19, 2012, 7 pgs.

*Primary Examiner* — Quang Van
(74) *Attorney, Agent, or Firm* — Paul D. Strain, Esq.; Strain & Strain PLLC (57) ABSTRACT

The application relates to an induction heating device having a housing and a fluid duct. The fluid duct is arranged in the housing and has a fluid inlet and a fluid outlet. Inside the housing is an induction element which generates an alternating magnetic field and which is separated from the fluid duct in a sealed manner by at least one wall. The device also includes at least one metallic areal heating element arranged in the fluid duct which can be heated by the alternating magnetic field.

13 Claims, 5 Drawing Sheets

(51) Int. Cl.
  *B60H 1/22* (2006.01)
  *F24H 1/10* (2006.01)
(58) Field of Classification Search
  USPC ....... 219/629, 528, 630, 631, 611, 651, 667,
          219/670, 672, 674, 661; 432/77, 4, 78,
          432/81, 233; 118/724
  See application file for complete search history.

(56) References Cited

U.S. PATENT DOCUMENTS

| | | | |
|---|---|---|---|
| 4,471,191 A | | 9/1984 | Greis et al. |
| 5,334,819 A | | 8/1994 | Lin |
| 5,466,915 A | * | 11/1995 | Meier .................... A47J 39/006 |
| | | | 219/621 |
| 5,958,273 A | * | 9/1999 | Koch ..................... B01J 8/0285 |
| | | | 219/651 |
| 2001/0017296 A1 | | 8/2001 | Katayama et al. |
| 2009/0092384 A1 | * | 4/2009 | Luo ........................ H05B 6/108 |
| | | | 392/488 |

FOREIGN PATENT DOCUMENTS

| | | |
|---|---|---|
| GB | 787125 A | 12/1957 |
| JP | S58-66283 A | 4/1983 |
| JP | 9-289076 A | 11/1997 |
| JP | 2001-241769 A | 9/2001 |
| JP | 2011-238449 A | 11/2011 |
| WO | WO 2008/007819 A1 | 1/2008 |
| WO | WO 2009/050631 A1 | 4/2009 |
| WO | WO 2009/130761 A1 | 10/2009 |
| WO | WO 2009/156190 A1 | 12/2009 |

\* cited by examiner

HEATING DEVICE

CROSS-REFERENCE TO RELATED PATENT APPLICATIONS

This application is based upon and claims the benefit of priority from prior European Patent Application No. 12290256.2-2423, filed Jul. 24, 2012, the entire contents of which are incorporated herein by reference in their entirety.

TECHNICAL FIELD

The invention relates to a heating device, in particular for motor vehicles.

PRIOR ART

Heating devices are known in the prior art. For example, there are air-side heating devices which have so-called PTC heating elements which are supplied with electrical current and thereby warm up. Via air-side lamellae which are in contact with the PTC elements, the heat is transferred to the air flowing through. Said heating devices are however of a design fundamentally different from that required for liquid media.

Heating devices for liquid media are provided with a closed housing which is formed with a fluid duct having a fluid inlet and a fluid outlet, wherein a heating element which is heated by means of a PTC element projects into the housing.

Said heating device for liquid media has the disadvantage that the heat is generated in a region other than in the fluid duct through which the liquid medium to be heated flows. As a result, owing to the existing transfer resistances, delayed heating is attained, which must be regarded as disadvantageous.

PRESENTATION OF THE INVENTION, PROBLEM, SOLUTION, ADVANTAGES

The problem addressed by the invention is that of providing a heating device which is improved in relation to the prior art and which realizes direct heating of the fluid flowing through.

This is achieved by means of the features of Claim 1.

One exemplary embodiment provides a heating device having a housing and having a fluid duct which is arranged in said housing and which has a fluid inlet and a fluid outlet, wherein, in the housing, there is provided an element which generates an alternating magnetic field and which is separated from the fluid duct in a sealed manner by at least one wall, wherein furthermore, at least one metallic areal heating element is provided which can be heated by the alternating magnetic field, wherein the at least one areal heating element is arranged in the fluid duct. In this way, the element which generates the alternating magnetic field is outside the fluid duct and the fluid flow through the fluid duct, wherein the areal heating element is arranged in the fluid duct and thus in the fluid flow. In this way, a separation of the electrical system is preferably attained, specifically between the element which generates the alternating magnetic field outside the flow duct, and the areal heating element which warms up in the fluid duct.

Here, it is particularly preferable if a fluid can flow over the areal heating element at one side or at both sides. The areal heating element is preferably in direct contact with the fluid flowing through the fluid duct. Effective and fast heating of the fluid is thereby attained.

It is also expedient if a fluid can flow over the areal heating element at both sides, wherein the flow direction of the fluid on one side of the areal heating element is the same as or opposite to the flow direction on the other side of the areal heating element. In this way, the fluid is conducted in succession firstly past one side and subsequently past the other side of the areal heating element. This increases the effectiveness of the heating.

It is also expedient if an element which generates the alternating magnetic field is a substantially areal planar or hollow cylindrical element.

It is also advantageous if an areal heating element is a substantially areal planar or hollow cylindrical element.

It is also advantageous if an element which generates the alternating magnetic field is a hollow cylindrical element, wherein at least one areal heating element is arranged radially inside and/or outside the hollow cylindrical element which generates the alternating magnetic field. In this way, a heating device is produced which is expedient in terms of installation space.

It is also advantageous if one or more hollow cylindrical areal heating elements are arranged radially inside and outside the hollow cylindrical element which generates the alternating magnetic field. In this way, too, the heat output can be increased.

It is also advantageous if an element which generates the alternating magnetic field is a substantially planar element, wherein at least one areal heating element is arranged adjacent, at one side or at both sides, to the element which generates the alternating magnetic field. A particularly flat design can be realized in this way.

It is advantageous if one or more substantially planar areal heating elements are arranged adjacent, at both sides, to the element which generates the alternating magnetic field. The heat output can be increased in this way.

It is also advantageous if an element which generates the alternating magnetic field is a substantially planar areal or hollow cylindrical coil.

It is also advantageous if a control unit is provided for controlling the element which generates an alternating magnetic field.

Here, it is advantageous if the control unit is connected to or integrated into the housing.

It is also advantageous if the housing is composed of a material which absorbs magnetic fields or which is non-transparent to alternating magnetic fields.

Here, it is also advantageous if the wall is composed of a material which is substantially transparent to magnetic fields.

Further advantageous refinements are described by the following description of the figures and by the subclaims.

BRIEF DESCRIPTION OF THE DRAWINGS

The invention will be explained in more detail below on the basis of at least one exemplary embodiment and with reference to the drawings, in which.

PREFERRED EMBODIMENT OF THE INVENTION

Figure 1:
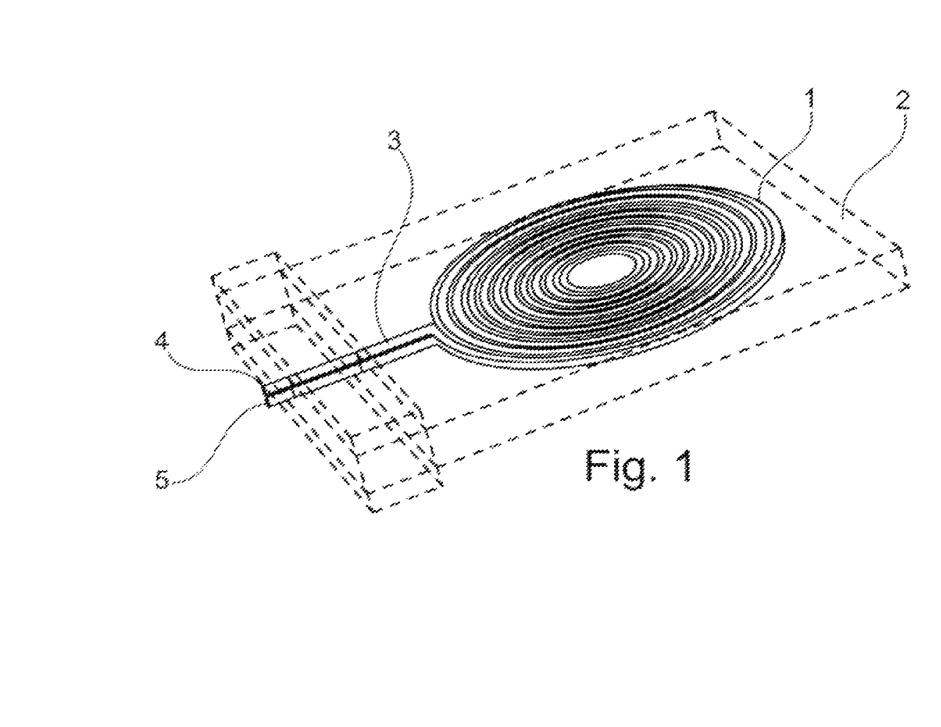
FIG. 1 shows a schematic view of an electrical heating element accommodated in a wall.

FIG. 1 shows an element 1 which generates an alternating magnetic field, which element is surrounded by a surrounding wall 2 and is thus accommodated so as to be sealed off with respect to the outside and electrically insulated. The wall 2 is preferably a closed housing which can be inserted into a fluid duct, such that the element 1 which generates an alternating magnetic field is electrically separated from the fluid duct and from the fluid flowing through the fluid duct. The element 1 which generates an alternating magnetic field is in the form of a coil which is of substantially flat and circular form. The coil is wound from a multi-core strand 3 which is preferably wound in double-layer form such that the two terminal lines 4, 5 of the strand 3 run parallel to one another. The element for generating an alternating magnetic field, said element being in the form of a coil, is preferably cast integrally in the wall 2. In this way, a positionally stable arrangement of the coil in the wall is generated because the coil cannot move within the wall.

Figure 2:
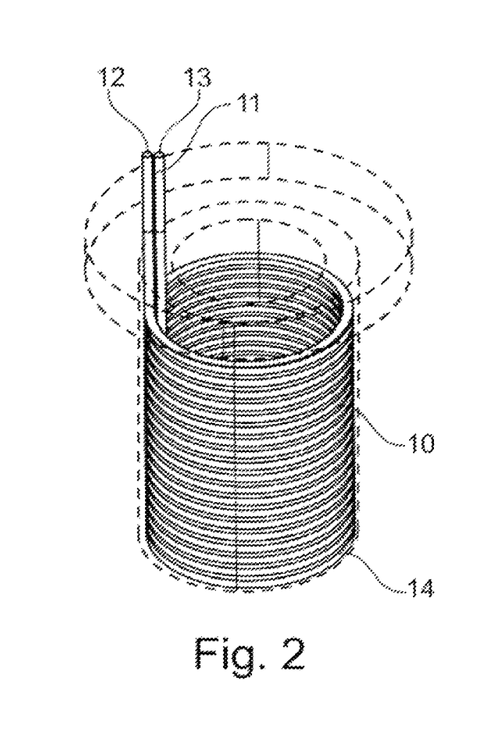
FIG. 2 shows a schematic view of an electrical heating element accommodated in a wall.

FIG. 2 shows a further exemplary embodiment of an element 10 which can generate an alternating magnetic field. The element 10 is in the form of a coil which is of hollow cylindrical form. Here, the coil 10 is formed by a wound strand 11 which is guided in double-layer configuration, such that the terminals 12 and 13 are guided substantially parallel to one another. The strand is also advantageously of multi-core form.

The element 10 is accommodated in a wall 14 which is in the form of a double-walled hollow cylinder, wherein the wall 14 completely surrounds and seals off the element 10. The element 10 is preferably cast integrally within the wall 14.

Figure 3:
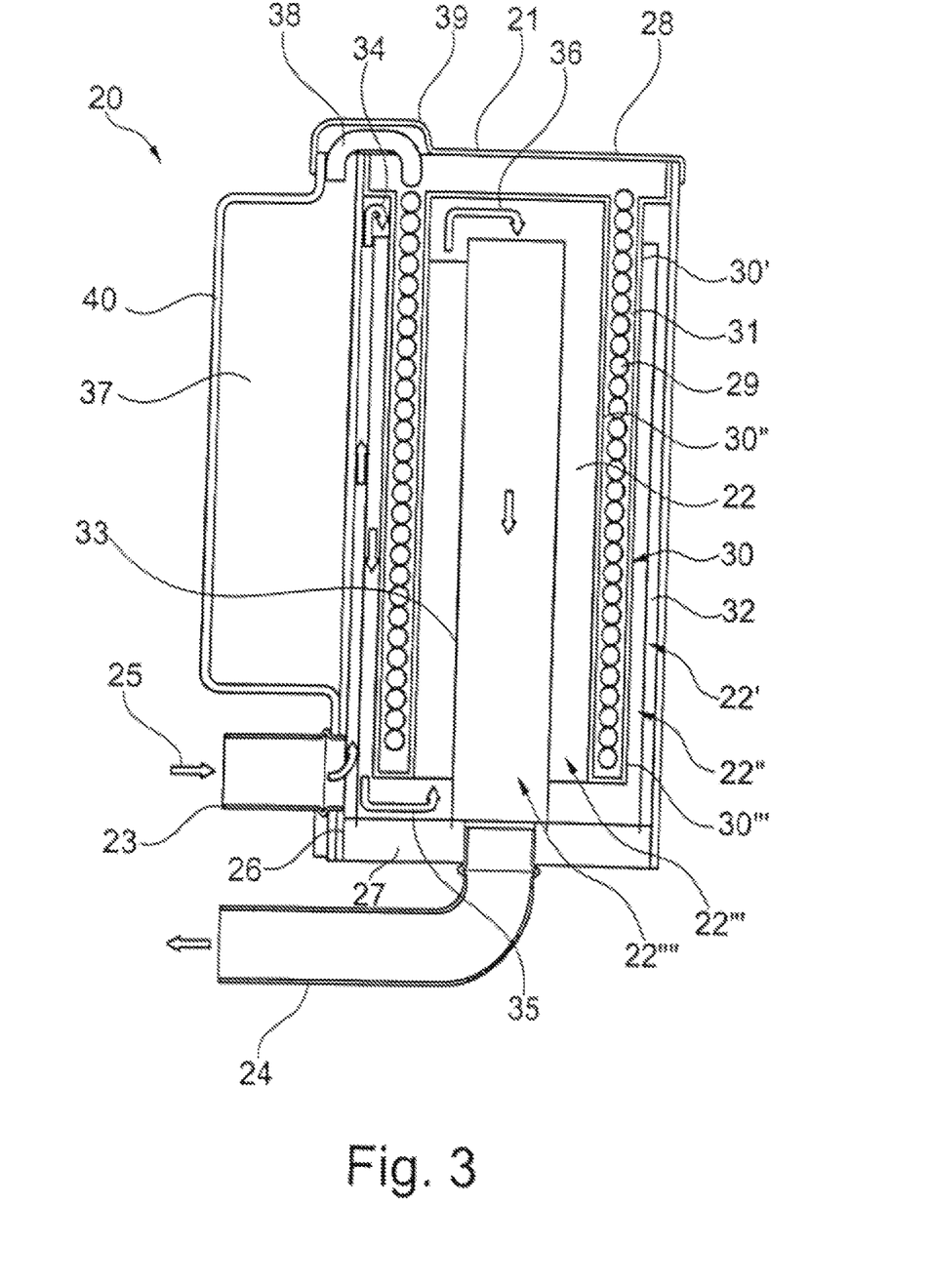
FIG. 3 shows a sectional view of a heating device.

FIG. 3 shows an exemplary embodiment of a heating device 20 having a housing 21 and having a fluid duct 22 arranged therein. The fluid duct 22 has a fluid inlet 23 and a fluid outlet 24, such that a fluid can flow into the fluid inlet 23 as per arrow 25, can flow through the fluid duct 22, and can exit the housing 21 again at the fluid outlet 24.

The housing 21 is of substantially cylindrical form, wherein the fluid inlet 23 is arranged on a cylinder wall 26. The fluid outlet 24 is arranged on a base wall 27 of the cylinder of the housing 21. The fluid inlet is preferably arranged at the lower end of the cylindrical housing 21. The fluid outlet 24 is preferably arranged in the middle of the base wall 27.

The housing 21 is thus formed at least by a cylindrical shell having a cylinder wall 26 and having a lower base wall 27 and an upper cover 28, wherein the housing may also comprise further elements.

An element 29 which generates an alternating magnetic field is accommodated, as a hollow cylindrical coil, in the cylindrical housing 21.

The coil as the element 29 which generates an alternating magnetic field is arranged within a wall 30 which substantially completely surrounds the element 29. Here, the wall 30 has a radially outer wall region 30' and a radially inner wall region 30", said wall regions being closed off at the top by the housing cover 28 and being closed in the lower region by a wall region 30'''. Here, the wall region 30''' is an annular wall region.

The wall 30 thus substantially completely surrounds the coil as an element 29 which generates an alternating magnetic field. Here, the element 29 may additionally be cast integrally within the wall 30 by means of a casting compound 31 and thus accommodated in a dimensionally stable manner. The casting compound is introduced into the free spaces between the coil as an element 29 which generates an alternating magnetic field and the wall 30.

Furthermore, in the housing 21, there are provided two areal heating elements 32, 33 which are in the form of hollow cylindrical areal elements. The areal heating elements 32, 33 are preferably formed from metal such that they warm up as a result of circulating currents generated in the wall thickness of the hollow cylindrical elements. The circulating currents are induced in the hollow cylindrical elements 32, 33 as areal heating elements owing to the alternating magnetic field. The areal heating elements are preferably in the form of thin metal sheets. Here, the wall thickness is approximately in the range from 0.08 to 0.5 mm.

The areal heating element 32 is of a hollow cylindrical form with a radius larger than the outer radius of the element 29 or the outer radius of the wall 30.

The areal heating element 33 is of hollow cylindrical design with a radius smaller than the inner radius of the element 29 or the inner radius of the wall 30, such that the areal heating element 33 is arranged radially within the element 29.

Furthermore, the areal heating element 32 is dimensioned such that its radius is smaller than the radius of the hollow cylindrical housing 21. The areal heating element 32 is accommodated between the wall 30 and the housing 21.

As a result, a multi-channel fluid duct 22 for the throughflow of the fluid is formed within the housing. The fluid duct 22 is formed by the fluid ducts 22', 22'', 22''', 22'''' which are formed, from the outside to the inside, as annular stream channels. The fluid 25 flows through the fluid inlet 23 into the housing 21. Said fluid flows into the fluid duct 22' at the bottom in the housing and flows axially upward along the areal heating element 32 in the direction of the cover 28. In the vicinity of the cover, the fluid is diverted as per arrow 34 and flows through the fluid duct 22'' along the areal heating element 33 in the downward axial direction toward the base 27. There, the fluid is diverted again as per arrow 35 and flows axially upward again along the fluid duct 22''' in the direction of the cover 28. There, the fluid is diverted again as per arrow 36 and flows downward again through the fluid duct 22'''' in the direction of the base and to the fluid outlet 24.

The fluid thus flows twice along the areal heating element 32 along the fluid ducts 22' and 22'' and twice along the areal heating element 33 along the fluid ducts 22''' and 22''''. Subsequently, the fluid exits the heating device and flows out of the fluid outlet 24.

Arranged adjacent to the housing 21 and to the wall 26 is a control device 37 which actuates the element 29 which generates an alternating magnetic field. For this purpose, the terminal lines 38 of the element 29 are guided into the control unit 37. For this purpose, the cover 28 has a recess or protuberance 39 in order that the terminal lines 38 can be guided over from the region of the wall 30 into the housing 40 of the control unit 37.

It can be seen that the spacing between the wall 30' and the areal heating element 32 is smaller than the spacing between the wall 30'' and the areal heating element 33. A reason for this is that, owing to the different spacings, the alternating magnetic field causes substantially equal areal energy densities to be generated in the surfaces of the areal heating elements 32 and 33, which are in the form of hollow cylindrical elements, such that the heating of the fluid by the areal heating element 32 is substantially identical, per unit of area, to the heating of the fluid by the areal heating element 33.

Other configurations of the heating device may however also deviate from the above-described arrangement of the areal heating elements. The spacings between the respective areal heating element 32 and 33 and the adjacent wall 30' and 30" of the element 29 may be varied. The spacing between the areal heating element 33 and the wall 30" may be equal to the spacing between the areal heating element 32 and the wall 30'. Alternatively, the spacing between the areal heating element 33 and the wall 30" may also be smaller than the spacing between the areal heating element 32 and the wall 30'.

Figure 4:
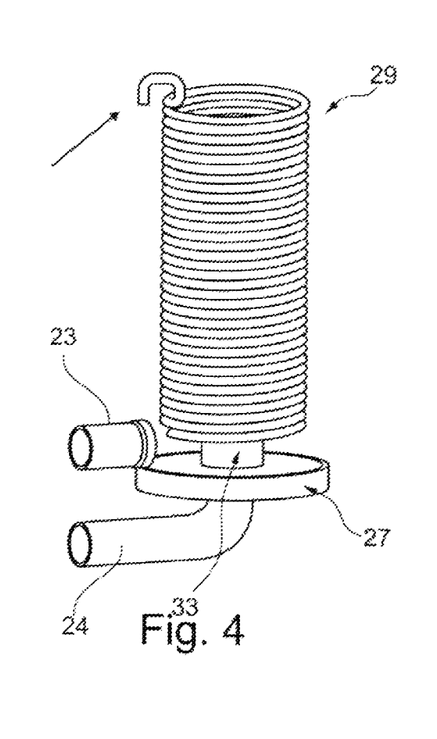
FIG. 4 shows a view of elements of the heating device.

FIG. 4 shows the arrangement of the element 29 which, in the exemplary embodiment of FIG. 4, is in the form of a coil. Here, the coil may be wound in double-layer form with a metal strand, such that the two terminal lines of the coil can be guided parallel to one another.

Radially within the element 29 which is in the form of a coil it is possible to see an areal heating element 33 which projects into the hollow space of the coil. Said areal heating element 33 is held, at its axially lower end, by the base 27 on which the fluid outlet 24 is also arranged. For schematic reasons, the fluid inlet 23 connected to the outer cylindrical wall 26 of the housing 21 is illustrated.

Figure 5:
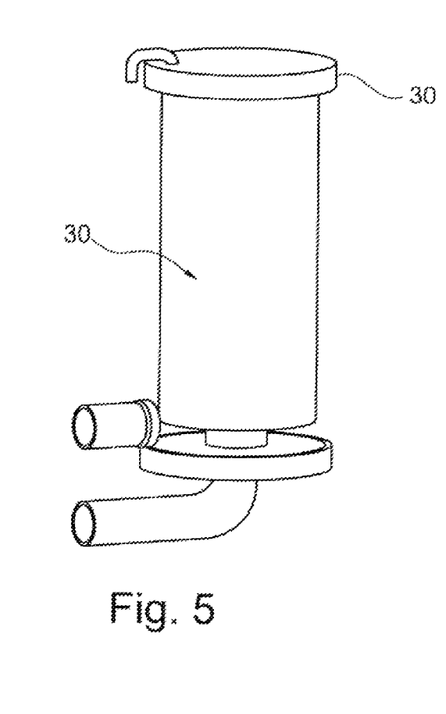
FIG. 5 shows a view of elements of the heating device.

FIG. 5 shows the configuration of FIG. 4, wherein the wall 30 is also illustrated. The wall 30 surrounds the element 29 in a sealed manner, such that the element 29 which generates an alternating magnetic field can be arranged entirely outside the fluid duct but in a sealed manner.

Figure 6:
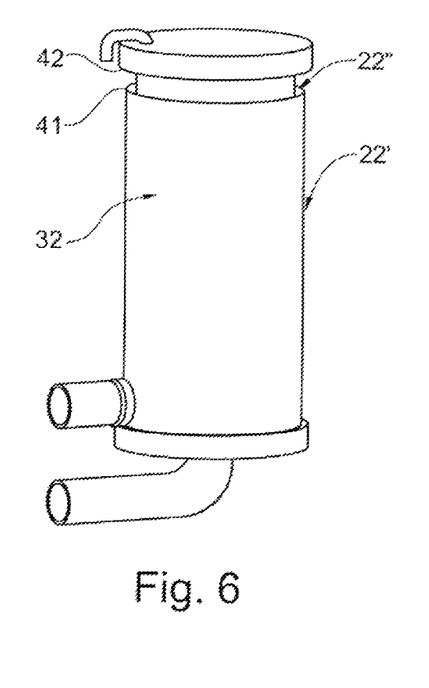
FIG. 6 shows a view of elements of the heating device.

FIG. 6 shows, in addition to the illustration of FIG. 5, the way in which the radially outer areal heating element 32 is arranged. Said radially outer areal heating element extends around the wall 30 and maintains a spacing to said wall 30 so as to form the fluid duct 22", wherein, in the axial direction between the upper edge 41 and the edge 42 of the wall 30, there is a spacing which allows the fluid to be diverted from the duct 22' into the duct 22".

Figure 7:
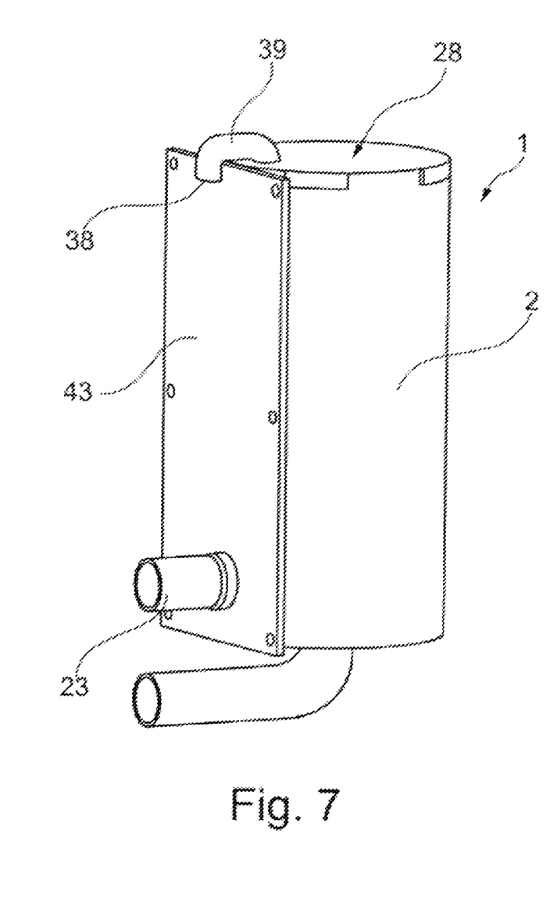
FIG. 7 shows a view of elements of the heating device.
Figure 8:
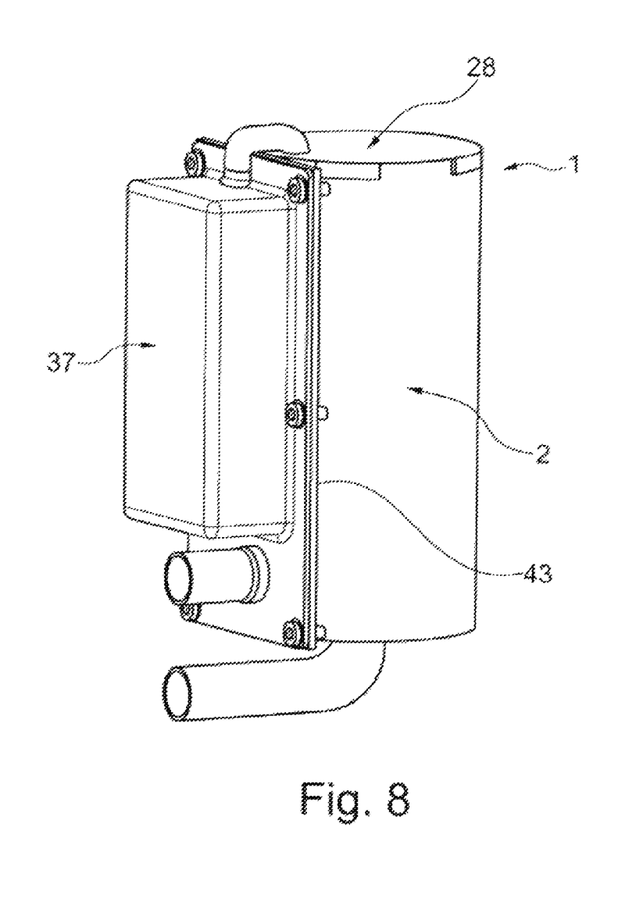
FIG. 8 shows a view of the heating device.

FIGS. 7 and 8 show the heating device 1 with the housing 2 and the closure cover 28. Also provided is a lateral flange 43 which serves for the fastening and abutment of the control unit 37.

Here, the flange 43 is either mounted as an additional part on the wall 2 or is formed in one piece with the wall. For this purpose, the wall with the flange 43 may be produced for example as an extruded component.

The fluid connector 23 is attached in the region of the flange 43 and serves for the supply of fluid to the heating device. The duct-like region 39 for guiding the terminals 38 of the element 29 over from the interior of the housing to the electronic control unit 37 can also be seen. Said duct-like region is of duct-like form and connects the interior of the housing to the control unit 37 via the cover 28. Here, the electronic control unit 37 is mounted on the flange 43 and is connected in heat-conducting fashion thereto. In this way, power electronics provided in the control unit 37 can be cooled by the fluid flowing through the heating device.

Figure 9:
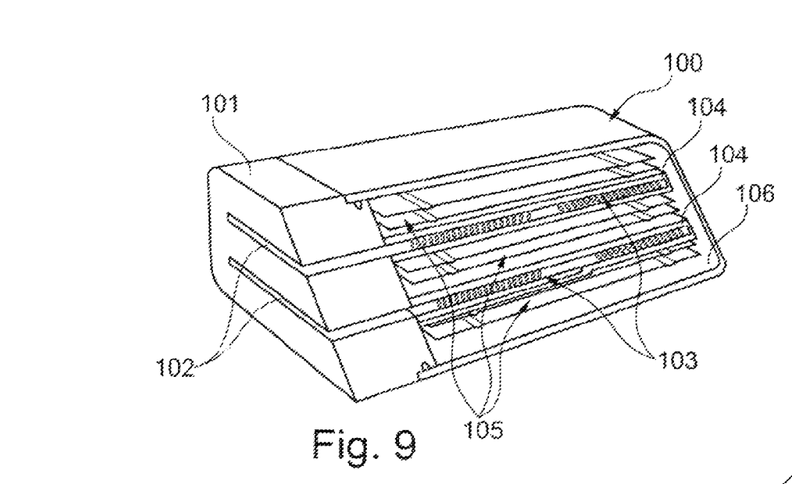
FIG. 9 shows a perspective sectional view of a further embodiment of a heating device.
Figure 10:
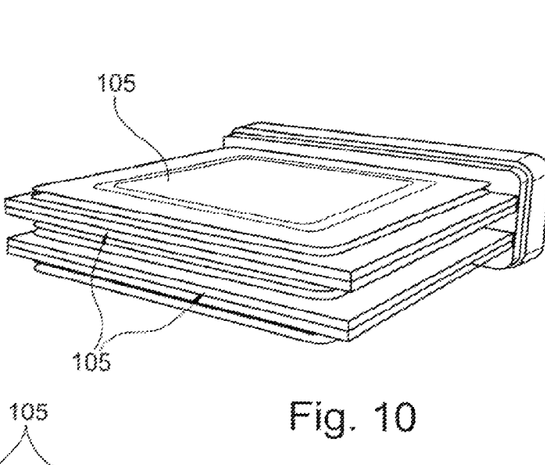
FIG. 10 shows a view of details of the heating device.
Figure 11:
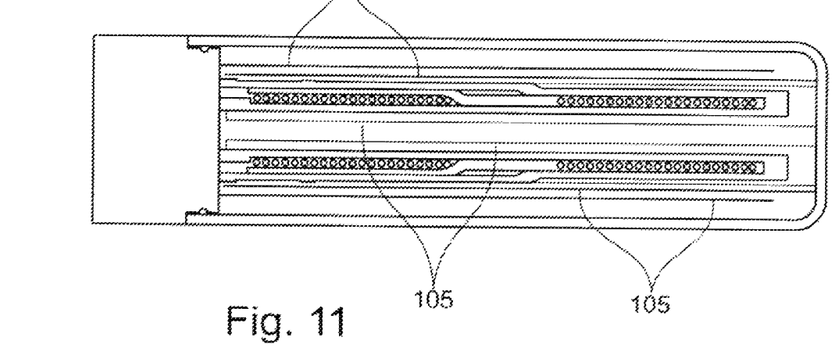
FIG. 11 shows a view of a section through the heating device.

FIGS. 9 to 11 show a further exemplary embodiment of the invention in which both the element which generates an alternating magnetic field and also the areal heating elements are not of hollow cylindrical form but rather are formed as substantially areal, flat and planar elements.

The exemplary embodiment of FIGS. 9 to 11 shows a housing 100 which is connected to a housing flange 101. The housing flange serves to provide the leadthroughs 102 for the retention and the electrical contacting of the element which generates an alternating magnetic field. In the housing 100 there are arranged two elements 103 which generate an alternating magnetic field, said elements being surrounded on both sides by a wall 104, such that the elements 103 are sealed off and separated from the fluid duct.

Areal heating elements 105 are arranged parallel to and spaced apart from the areal magnetic-field-generating elements 103 and the areal walls 104. It is advantageous for in each case two areal heating elements 105 to be arranged parallel to and spaced apart from one another on one side of a magnetic-field-generating element. It is alternatively also possible for only one areal heating element 105 to be arranged on one side of the element 103. Said areal heating elements 105 are arranged spaced apart from the walls 104 such that, both between the two areal heating elements 105 and also between an areal heating element 105 and a wall 104, a fluid flow can flow through the fluid duct 106 such that said fluid can be warmed by the areal heating elements 105.

In the exemplary embodiment of FIGS. 9 to 11, it can be seen that two areal heating elements 105 are arranged in each case parallel to one another. In this way, a configuration is shown which is an alternative to the example of FIGS. 3 to 8, in which only one areal heating element is arranged at both sides of the coil. In the exemplary embodiment of FIGS. 3 to 8, it would alternatively also be possible for multiple areal heating elements arranged parallel to be provided on each side of the coil, which areal heating elements serve for the heating of the fluid flowing through.

With regard to the materials used, the wall 30 or 104 for accommodating and sealing off the coil-like element for generating an alternating magnetic field is preferably produced from a plastics material which is transparent to magnetic fields. In this way, the alternating magnetic field which is generated is not adversely affected by the wall 30 or 104.

By contrast, the housing wall 100 or 2 is formed from a material which is non-transparent to magnetic fields, such that the magnetic field generated within the housing preferably does not penetrate out of the housing 2 to the outside but rather is shielded by the housing 2. Metallic materials, for example, such as aluminum, for example, are suitable for this purpose. Said material has the advantage that an alternating magnetic field in the region of the housing likewise generates circulating currents in said material and thus the wall of the housing is itself warmed, such that even the housing can exhibit the action of a heating element.

The element which generates an alternating magnetic field is preferably wound from a high-frequency strand which is a multi-core strand. It is thus possible for a flat or hollow cylindrical coil to be wound in a simple and expedient manner. It is advantageous here for the coil to be accommodated or embedded or cast in an electrically non-conductive material such as a plastics housing. Here, the coil may be wound in single-core or double-core configuration.

The coil for generating the alternating magnetic field as the element for generating an alternating magnetic field is incorporated, together with a capacitor within a control electronics arrangement, in a resonant circuit which is activated or driven by switching transistors. The control electronics arrangement is preferably integrated into the control unit. The frequency of the resonant circuit is in this case approximately 10 to 80 kHz.

Owing to the material of the areal heating elements, the alternating magnetic field causes eddy currents to be induced in the areal heating elements, which eddy currents cause warming of the areal heating elements. If a fluid flows around said areal heating elements, this leads to warming of the fluid.

Preferred materials for the areal heating elements are metallic materials which exhibit good conduction, such as copper, steel or iron-containing materials. The material thickness is preferably between 0.08 and 0.5 mm.

The invention claimed is:

1. A heating device comprising
    a housing and a fluid duct, wherein the fluid duct is arranged in said housing and comprises a fluid inlet and a fluid outlet,
    an induction element which generates an alternating magnetic field, wherein the induction element is arranged in the housing and is separated from the fluid duct in a sealed manner by at least one wall, wherein the induction element is a hollow cylindrical element,
    at least two metallic areal heating elements, wherein the areal heating elements are heated by the alternating magnetic field, wherein the areal heating elements are arranged in the fluid duct, wherein the heating elements are hollow cylindrical elements, wherein at least one areal heating element is arranged radially outside the induction element and at least one areal heating element is arranged radially inside the induction element, wherein a fluid flows over and contacts both a radially outer side and a radially inner side of the at least one areal heating element arranged radially outside the induction element, and wherein the fluid flows over and contacts both a radially outer side and a radially inner side of the at least one areal heating element arranged radially inside the induction element,
    wherein the wall consists essentially of a material which is transparent to magnetic fields, wherein the fluid flows over and contacts the at least one wall on both sides.

2. The heating device according to claim 1,
    wherein the flow direction of the fluid on one side of the at least one areal heating element arranged radially outside the induction element is opposite to the flow direction on the other side of the at least one areal heating element arranged radially outside the induction element,
    wherein the flow direction of the fluid on one side of the at least one areal heating element arranged radially inside the induction element is opposite to the flow direction on the other side of the at least one areal heating element arranged radially inside the induction element.

3. The heating device according to claim 1, wherein the induction element is a hollow cylindrical coil.

4. The heating device according to claim 1, wherein a control unit is provided for controlling the induction element.

5. The heating device according to claim 4, wherein the control unit is connected to or integrated into the housing.

6. The heating device according to claim 1, wherein the housing is composed of a material which absorbs magnetic fields or which is non-transparent to alternating magnetic fields.

7. The heating device of claim 1, wherein the at least one areal heating element arranged radially outside the induction element is arranged entirely radially outside the induction element, and wherein the at least one areal heating element arranged radially inside the induction element is arranged entirely radially inside the induction element.

8. A heating device comprising:
    a housing and a fluid duct, wherein the fluid duct is arranged in said housing and comprises a fluid inlet and a fluid outlet,
    an induction element which generates an alternating magnetic field, wherein the induction element is arranged in the housing and is separated from the fluid duct in a sealed manner by at least one wall, wherein the induction element is a substantially planar element,
    at least two metallic areal heating elements, wherein the areal heating elements are heated by the alternating magnetic field, wherein the areal heating elements are arranged in the fluid duct, wherein the areal heating elements are arranged adjacent on both sides to the induction element, wherein the heating elements are substantially planar elements, and wherein a fluid flows over and contacts both sides of the a first areal heating element of the areal heating elements, wherein the fluid flows over and contacts both sides of the a second areal heating element of the areal heating elements,
    wherein the wall consists essentially of a material which is transparent to magnetic fields, wherein the fluid flows over and contacts the at least one wall on both sides.

9. The heating device according to claim 8,
    wherein the flow direction of the fluid on one side of the first areal heating element is opposite to the flow direction on the other side of the first areal heating element,
    wherein the flow direction of the fluid on one side of the second areal heating element is opposite to the flow direction on the other side of the second areal heating element.

10. The heating device according to claim 8, wherein the induction element is a substantially planar areal coil.

11. The heating device according to claim 8, wherein a control unit is provided for controlling the induction element.

12. The heating device according to claim 11, wherein the control unit is connected to or integrated into the housing.

13. The heating device according to claim 8, wherein the housing is composed of a material which absorbs magnetic fields or which is non-transparent to alternating magnetic fields.

* * * * *